United States Patent
Oota (10) Patent No.: US 10,401,163 B2
(45) Date of Patent: Sep. 3, 2019

(54) CALCULATION METHOD, MEASUREMENT APPARATUS, STORAGE MEDIUM, AND INFORMATION PROCESSING APPARATUS

(71) Applicant: CANON KABUSHIKI KAISHA, Tokyo (JP)

(72) Inventor: Tetsuji Oota, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 407 days.

(21) Appl. No.: 14/859,496

(22) Filed: Sep. 21, 2015

(65) Prior Publication Data

US 2016/0091295 A1 Mar. 31, 2016

(30) Foreign Application Priority Data

Sep. 26, 2014 (JP) .................................. 2014-197507

(51) Int. Cl.
*G01B 21/04* (2006.01)

(52) U.S. Cl.
CPC .................................. *G01B 21/045* (2013.01)

(58) Field of Classification Search
None
See application file for complete search history.

(56) References Cited

U.S. PATENT DOCUMENTS

| 8,578,619 B2 | 11/2013 | Nakajima | |
| 2009/0299692 A1 * | 12/2009 | Yoshizumi | G01B 5/008 |
| | | | 702/168 |

FOREIGN PATENT DOCUMENTS

| EP | 1703251 A2 * | 9/2006 | ........... G01B 21/045 |
| JP | 3272952 B2 | 4/2002 | |
| JP | 2002357415 A | 12/2002 | |
| JP | 2005156235 A | 6/2005 | |
| JP | 2008101991 A | 5/2008 | |
| JP | 2012168001 A | 9/2012 | |

OTHER PUBLICATIONS

Office Action issued in Japanese Application No. 2014-197507 dated Jul. 9, 2018.

* cited by examiner

*Primary Examiner* — Cory W Eskridge
(74) *Attorney, Agent, or Firm* — Rossi, Kimms & McDowell LLP (57) ABSTRACT

The present invention provides a calculation method of calculating a shape of a surface to be measured, including a step of, based on an inclination angle of the surface in a scan direction of a probe, determining a first correction parameter used to correct a measurement error caused by scanning the probe in the first direction and a second correction parameter used to correct a measurement error caused by scanning the probe in the second direction.

8 Claims, 11 Drawing Sheets

CALCULATION METHOD, MEASUREMENT APPARATUS, STORAGE MEDIUM, AND INFORMATION PROCESSING APPARATUS

BACKGROUND OF THE INVENTION

Field of the Invention

The present invention relates to a calculation method, a measurement apparatus, a storage medium, and an information processing apparatus.

Description of the Related Art

As a measurement apparatus for accurately measuring the three-dimensional shape of an object to be measured such as an optical element or a die, a scan type measurement apparatus that obtains shape data of an object by scanning a measurement probe with respect to the object is proposed in Japanese Patent No. 3272952. Japanese Patent No. 3272952 discloses a measurement apparatus that brings the measurement probe into contact with a surface to be measured, detects a reaction force at the contact point, and scans the measurement probe along the surface while controlling the reaction force to a predetermined value, thereby quickly obtaining the shape data of the surface at a high resolution.

When scanning the measurement probe in contact with the surface, following two problems arise.

(1) A frictional force is generated at the contact point, resulting in an error to the contact force to be controlled.

(2) The surface is displaced by the contact force, resulting in an error to the contact point.

These problems are particularly conspicuous when the surface partially or generally has an inclination angle with respect to the scan direction of the measurement probe.

When scanned with respect to the surface, the measurement probe receives the reaction force of the contact force in a direction perpendicular to the surface and a frictional force in a direction parallel to the surface (inclined surface). The resultant of these forces is the force of another component to the force in the direction of gravity, and therefore becomes a factor (that is, measurement error) to incline the measurement probe.

Consider a case where the measurement probe is scanned in the upward direction or downward direction with respect to a surface having an inclination angle. Although the frictional force generated in the measurement probe always faces in the direction opposite to the scan direction, the reaction force of the contact force changes depending on the direction of the inclined surface. More specifically, if the scan direction of the measurement probe is the upward direction, the force of another component is relatively large. If the scan direction of the measurement probe is the downward direction, the force of another component is relatively small. This difference appears as the measurement error for each scan direction of the measurement probe.

Figure 12:
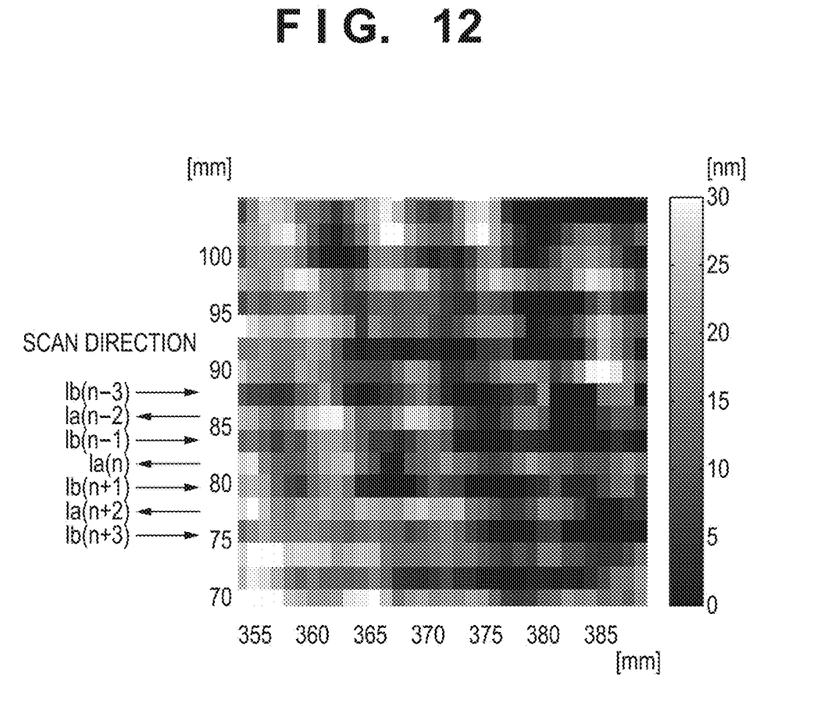
FIG. 12 is a view showing an example of shape data of a surface obtained by a measurement apparatus.

FIG. 12 is a view showing an example of shape data of a surface obtained by the measurement apparatus. A raster pattern that alternately changes the scan direction is employed as the scan pattern of the measurement probe to increase the measurement efficiency. Referring to FIG. 12, discontinuous step-shaped errors can be observed between shape data (data lines) la and lb of line regions adjacent (that is, in different scan directions) on the surface. This is because the above-described error factor has a characteristic depending on the scan direction of the measurement probe, and therefore, shape data in different scan directions are discontinuous, and a measurement error of a higher-order spatial frequency component occurs. The higher-order spatial frequency component will be defined as a spatial band component corresponding to the measurement pitch of the measurement probe hereinafter.

To cope with such a measurement error, adjacent shape data may be averaged or weighted and averaged. For example, processing represented by $$la(n)' = la(n) \times 0.5 + \{lb(n-1) + lb(n+1)\} \times 0.25 \quad (1)$$

is performed for nth shape data $la(n)$ and shape data $lb(n-1)$ and $lb(n+1)$ before and after that, thereby obtaining smoothed shape data $la(n)'$.

However, the averaging processing lowers the resolution of the total shape data of the surface. Hence, to obtain the same resolution, the number of shape data needs to be almost doubled, resulting in a low measurement efficiency.

A technique of solving the problems concerning inclination and friction of the surface at the time of scanning of the measurement probe is proposed in Japanese Patent Laid-Open No. 2012-168001 or 2005-156235. Japanese Patent Laid-Open No. 2012-168001 discloses a measurement apparatus including a driving mechanism that drives the measurement probe in the z-axis direction. In this measurement apparatus, when scanning the measurement probe with respect to the inclined surface, a force in the x-axis direction generated in the measurement probe is detected. If the force exceeds a threshold, the measurement probe is driven in the z-axis direction to reduce a change in the contact force.

Consider the force in the x-axis direction generated in the measurement probe. The force in the x-axis direction is smaller when scanning the measurement probe with respect to the inclined surface in the descending direction than when scanning the measurement probe with respect to the inclined surface in the ascending direction. Hence, Japanese Patent Laid-Open No. 2005-156235 discloses a measurement method of accurately obtaining the shape of a surface by employing only shape data obtained by scanning the measurement probe with respect to the inclined surface in the descending direction.

However, the measurement apparatus disclosed in Japanese Patent Laid-Open No. 2012-168001 needs a detection mechanism for detecting the force in the x-axis direction generated in the measurement probe and a driving mechanism for driving the measurement probe in the z-axis direction. These mechanisms complicate the apparatus arrangement and increase the weight of the measurement probe. Hence, it is not realistic to form a measurement apparatus as disclosed in Japanese Patent Laid-Open No. 2012-168001.

In the measurement method disclosed in Japanese Patent Laid-Open No. 2005-156235, since shape data obtained by scanning the measurement probe with respect to the inclined surface in the ascending direction is not employed, the resolution of the total shape data of the surface lowers to about ½. To suppress such lowering of resolution, for example, the measurement probe needs to be scanned twice in one line region, and the time required to measure the shape of the surface doubles.

SUMMARY OF THE INVENTION

The present invention provides a technique advantageous in accurately measuring the shape of a surface in a short time.

According to one aspect of the present invention, there is provided a calculation method of calculating a shape of a surface to be measured, including a first step of obtaining first shape measurement data representing a shape of a line region of the surface obtained by measuring the line region while scanning a probe in a first direction with respect to the surface and second shape measurement data representing a shape of a line region of the surface obtained by measuring the line region while scanning the probe in a second direction different from the first direction with respect to the surface, a second step of, based on an inclination angle of the surface in a scan direction of the probe, determining a first correction parameter used to correct a measurement error caused by scanning the probe in the first direction and a second correction parameter used to correct a measurement error caused by scanning the probe in the second direction, and a third step of obtaining first corrected shape data by correcting the first shape measurement data using the first correction parameter, obtaining second corrected shape data by correcting the second shape measurement data using the second correction parameter, and generating total shape data representing a total shape of the surface by compositing the first corrected shape data and the second corrected shape data.

Further aspects of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

First Embodiment

Figure 1A:
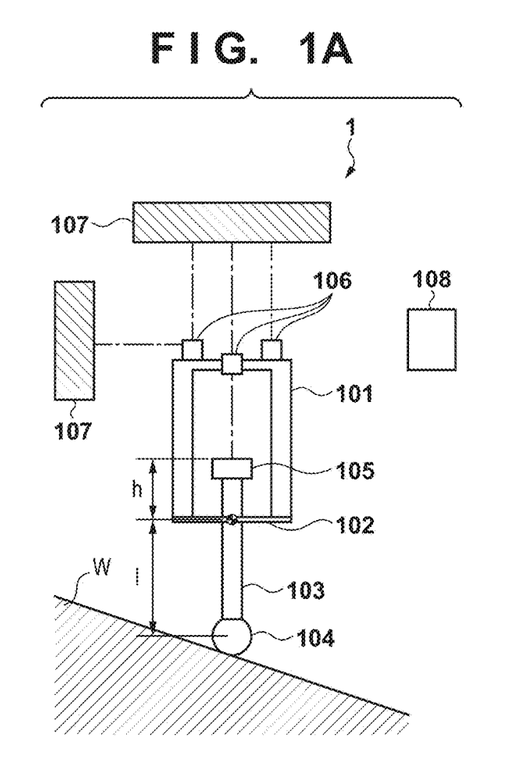
FIGS. 1A to 1C are views for explaining a measurement apparatus for measuring the shape of a surface to be measured.

A measurement apparatus 1 for measuring the shape of a surface W to be measured will be described with reference to FIGS. 1A to 1C. The measurement apparatus 1 includes a measurement probe 101, a leaf spring 102, a probe shaft 103, a probe sphere 104, a probe mirror 105, interferometers 106, reference mirrors 107, and a control unit 108. A scan direction in which the measurement probe 101 is scanned will be described below as a one-dimensional direction.

The measurement probe 101 is driven by a driving stage (not shown). The measurement probe 101 holds the probe shaft 103 via the leaf spring 102. The probe shaft 103 includes the probe sphere 104 that comes into contact with the surface W, and the probe mirror 105 that reflects measurement light for measuring the position of the probe shaft 103. In other words, the probe sphere 104 is provided at one end of the probe shaft 103, and the probe mirror 105 is provided at the other end of the probe shaft 103.

The measurement probe 101 is provided with the plurality of interferometers 106. The interferometers 106 irradiate the plurality of reference mirrors 107 on the measurement apparatus with measurement light, thereby exactly measuring the position and orientation of the measurement probe 101. The interferometers 106 can also measure the position of the probe mirror 105 with respect to the measurement probe 101.

A force in the z-axis direction at the contact point between the probe sphere 104 and the surface W can be obtained based on the spring constant of the leaf spring 102 from displacement of the probe mirror 105 relative to the measurement probe 101. The driving stage drives the measurement probe 101 such that the force becomes constant, thereby scanning the measurement probe 101 in contact with the surface W. The coordinates of the contact point of the probe sphere 104, that is, shape data of the surface W can thus be obtained as (a set of) coordinate data of the probe sphere 104.

The coordinate data of the probe sphere 104 is data obtained by the interferometers 106. For example, when heterodyne interferometers are used as the interferometers 106, and an air-conditioned temperature-controlled environment is prepared, measurement can be performed on the order of nm to sub nm order in principle.

The control unit 108 includes a CPU, a memory, and the like, and controls whole parts (units) of the measurement apparatus 1. The control unit 108 controls processing for measuring the shape of the surface W, associated calculation processing, and the like.

Figure 1B:
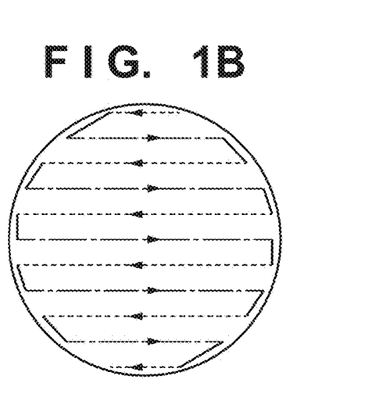
Figure 1C:
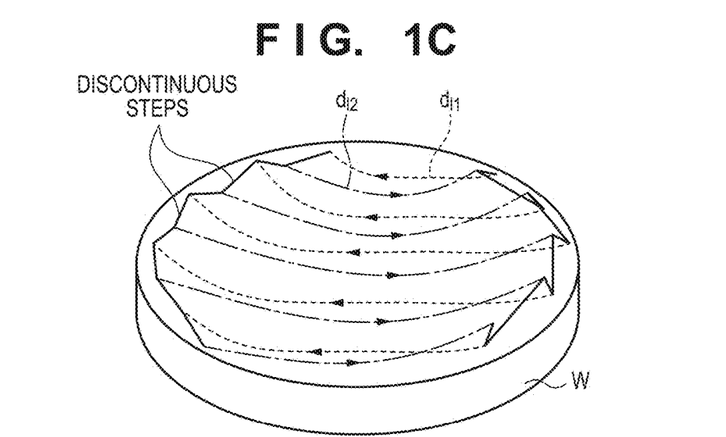

FIGS. 1B and 1C are views showing the outline of shape data of the surface W obtained by the measurement apparatus 1. As shown in FIG. 1A, the measurement probe 101 with the probe sphere 104 in contact with the surface W is scanned with respect to the surface W, thereby obtaining coordinate data of the probe sphere 104, that is, shape data (shape measurement data) of the surface W. At this time, a raster pattern as shown in FIG. 1B is employed as the scan pattern of the measurement probe 101. In the raster pattern, to measure adjacent line regions of the surface W, the measurement probe 101 is scanned in opposite directions, which are indicated by a broken line and an alternate long and short dashed line, respectively. In this case, as shown in FIG. 1C, first shape data $d_{f1}$ representing the shape of a line region when the measurement probe 101 is scanned in the first direction and second shape data $d_{f2}$ representing the shape of a line region when the measurement probe 101 is scanned in the second direction are obtained. The first direction and the second direction are directions different from each other, for example, opposite directions. The first shape data $d_{f1}$ and the second shape data $d_{f2}$ include different measurement errors. The measurement errors included in the first shape data $d_{f1}$ and the second shape data $d_{f2}$ are errors caused by an inclination angle θ of the surface W and the scan direction of the measurement probe 101. Hence, if the first shape data $d_{f1}$ and the second shape data $d_{f2}$ are directly composited, a discontinuous step-shaped error, that is, a measurement error of a higher-order spatial frequency component appears between the first shape data $d_{f1}$ and the second shape data $d_{f2}$.

Figure 2A:
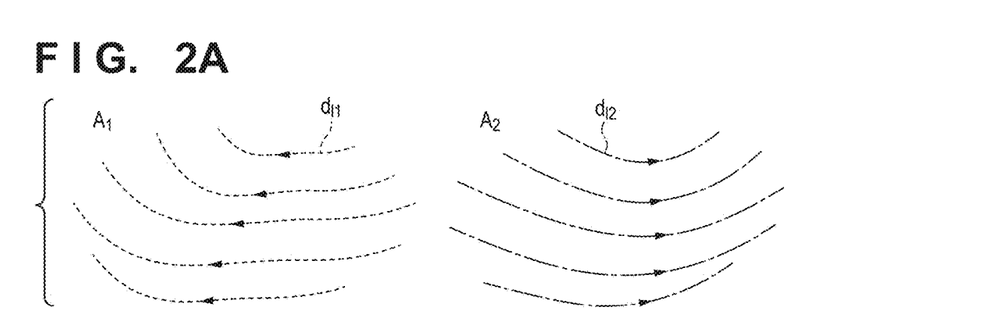
FIGS. 2A to 2D are views for explaining processing for shape data in a measurement method according to the first embodiment.

FIGS. 2A to 2D are views for explaining processing for shape data in a measurement method according to this embodiment. FIG. 3 is a flowchart for explaining the measurement method according to this embodiment. This measurement method is executed by generally controlling the units of the measurement apparatus 1 by the control unit 108, as described above.

In step S11, line regions of the surface W, which are different from each other, are measured while scanning the measurement probe 101 with respect to the surface W in the first and second directions, thereby obtaining shape data of each line region, that is, shape data shown in FIG. 1B.

In step S12, the shape data obtained in step S11 is separated into the first shape data $d_{f1}$ representing the shape of the line region when the measurement probe 101 is scanned in the first direction and the second shape data $d_{f2}$ representing the shape of the line region when the measurement probe 101 is scanned in the second direction. More specifically, as shown in FIG. 2A, first shape data $A_1$ including only the first shape data $d_{f1}$ and second shape data $A_2$ including only the second shape data $d_{f2}$ are defined. The first shape data $A_1$ is a set of data points $a_1$ including x-, y-, and z-axis components, and can be represented by a combination of a true shape $A_1'$ of the surface W and a measurement error $u_1$ caused by the scan direction of the measurement probe 101. This also applies to the second shape data $A_2$. $A_1$, $A_2$, $A_1'$, $A_2'$, $a_1$, and $a_2$ are defined by $$A_1 = f(A_1', u_1) \quad (2)$$

$$A_2 = f(A_2', u_2) \quad (3)$$

$$A_1' = [a_{11}, a_{12}, \ldots, a_{1i}, \ldots, a_{1n}] \quad (4)$$

$$A_2' = [a_{21}, a_{22}, \ldots, a_{2j}, \ldots, a_{2m}] \quad (5)$$

$$a_{1i} = [x_{1i}, y_{1i}, z_{1i}] \quad (6)$$

$$a_{2j} = [x_{2j}, y_{2j}, z_{2j}] \quad (7)$$

In equation (2), the first shape data $A_1$ is expressed as a function f having the true shape $A_1'$ and the measurement error u1 as arguments. As the function f, an operation such as addition or multiplication of the true shape $A_1'$ and the measurement error $u_1$ can be assumed. This also applies to the second shape data $A_2$ (equation (3)).

Placing focus only on the first shape data $A_1$ or second shape data $A_2$, the scan direction does not change between the shape data. Hence, since the measurement error caused by the scan direction of the measurement probe 101 does not change between the shape data, the shape data are not discontinuous.

For easy understanding of the invention, a description will be made below by referring to only one shape data in each of the first shape data $A_1$ and the second shape data $A_2$. However, the present invention is not limited to this.

In step S13-1, a first correction parameter $P_1$ is determined as a parameter to be given to the first shape data $A_1$. Similarly, in step S13-2, a second correction parameter $P_2$ is determined as a parameter to be given to the second shape data $A_2$. The first correction parameter $P_1$ is a parameter used to correct the measurement error caused by scanning the measurement probe 101 in the first direction. The second correction parameter $P_2$ is a parameter used to correct the measurement error caused by scanning the measurement probe 101 in the second direction.

In this embodiment, the first correction parameter $P_1$ is determined for each line region of the surface W, that is, each of the first shape data $d_{f1}$ included in the first shape data $A_1$ based on the inclination angle of the surface W. Similarly, the second correction parameter $P_2$ is determined for each of the second shape data $d_{f2}$ included in the second shape data $A_2$ based on the inclination angle of the surface W.

Two methods will be described here in detail as a method of determining the first correction parameter $P_1$ and the second correction parameter $P_2$. Note that a method of determining the first correction parameter $P_1$ and a method of determining the second correction parameter $P_2$ are basically the same. Hence, the first correction parameter $P_1$ and the second correction parameter $P_2$ will generically referred to as a correction parameter, and a method of determining the correction parameter will be described below.

Figure 4A:
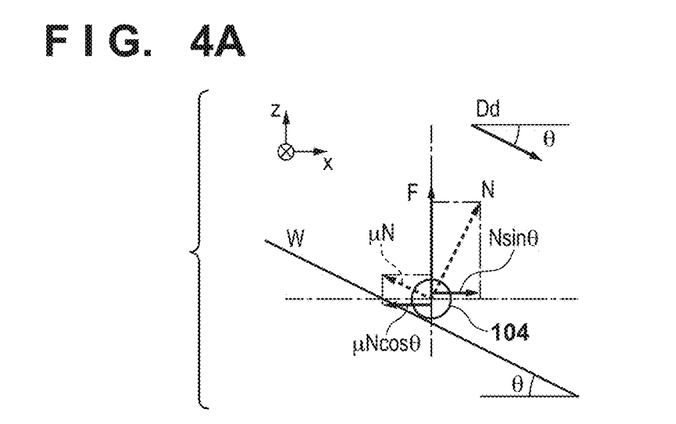
FIGS. 4A to 4C are views for explaining an example of a method of determining a first correction parameter and a second correction parameter.
Figure 4B:
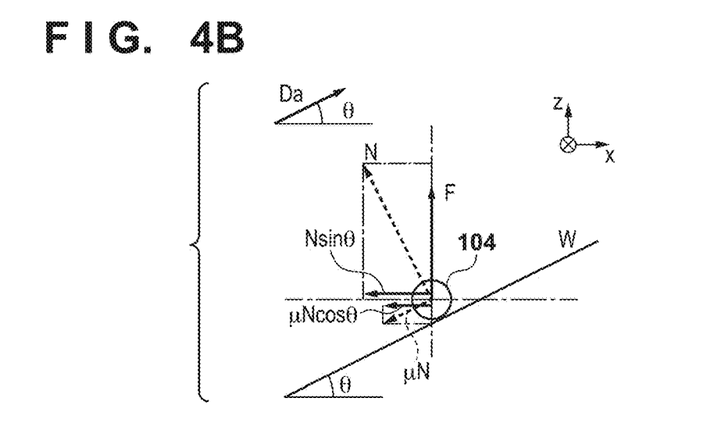
Figure 4C:
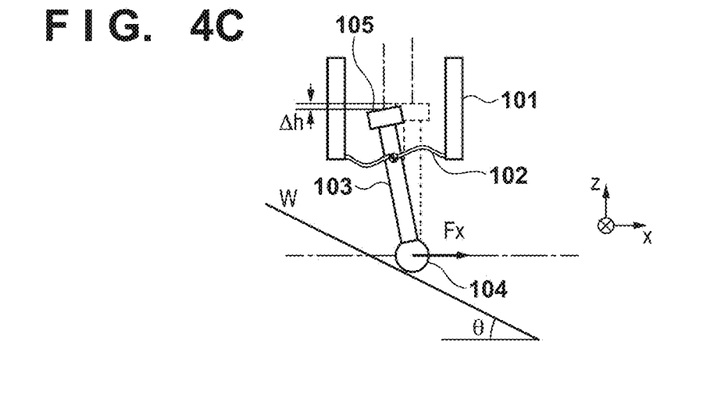

The first method of determining the correction parameter will be described with reference to FIGS. 4A to 4C. A measurement error caused by a frictional force at the contact point will be described first. As shown in FIGS. 4A to 4C, the measurement probe 101 is scanned in the x-axis direction in a state in which the probe sphere 104 is in contact with the surface W having an inclination angle θ. At this time, the measurement probe 101 is controlled by the driving stage such that the force in the z-axis direction, that is, a contact force F attains a predetermined value. The inclination angle θ is an angle made by the x-y plane (reference plane) and a scan direction Dd of the measurement probe 101. The inclination angle θ is positive in the z-axis direction. Hence, in FIG. 4A, the scan direction Dd of the measurement probe 101 is a downward direction, and the inclination angle θ is a negative angle. On the other hand, in FIG. 4B, a scan direction Da of the measurement probe 101 is an upward direction, and the inclination angle θ is a positive angle. In this way, the inclination angle θ of the surface W changes the sign between the upward direction and the downward direction as the scan directions of the measurement probe 101 with respect to the surface W.

Forces acting on the measurement probe 101 are a reaction force N in a direction perpendicular to the surface W and a frictional force. Out of the forces acting on the measurement probe 101, a force acting in a direction other than the z-axis direction, that is, a force Fx of another component is a factor to incline the measurement probe 101. Referring to FIGS. 4A and 4B, the reaction force N and the force Fx of another component are respectively given by $$N = F/(\cos θ - μ \sin θ) \quad (8)$$

$$Fx = -N \sin θ - μN \cos θ = -N(\sin θ + μ \cos θ) \quad (9)$$

where μ, is a dynamic friction coefficient when the measurement probe 101 is scanned in a state in which the probe sphere 104 is in contact with the surface W.

As shown in FIG. 4C, the product of the force Fx of another component and a length (the length from the center of the probe sphere 104 to the leaf spring 102) l of the probe shaft 103 is a moment that bends the leaf spring 102 holding the probe shaft 103. Letting K be the torsional stiffness of the leaf spring 102, an inclination φ of the probe shaft 103 is given by $$\phi = \frac{Fx \cdot l}{K} = \frac{-Fl}{K} \cdot \frac{\sin\theta + \mu\cos\theta}{\cos\theta - \mu\sin\theta} \qquad (10)$$

The inclination φ of the probe shaft 103 causes a position error Δh of the probe mirror 105, as shown in FIG. 4C. The position error Δh is given by $$\Delta h = h(1 - \cos\phi) = h\left\{1 - \cos\left(\frac{Fl}{K} \cdot \frac{\sin\theta + \mu\cos\theta}{\cos\theta - \mu\sin\theta}\right)\right\} \qquad (10)$$

where h is the length of the probe shaft 103 from the leaf spring 102 to the probe mirror 105.

For example, if θ=30 [deg], μ=0.1, l=0.02 [m], h=0.01 [m], F=0.01 [N], and K=0.1 [Nm/rad], Δh=10 [nm], which is a large error in measurement on the order of nm to be achieved.

Figure 2B:
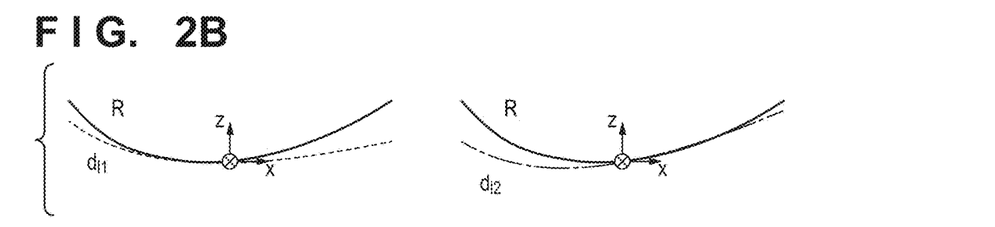
Figure 3:
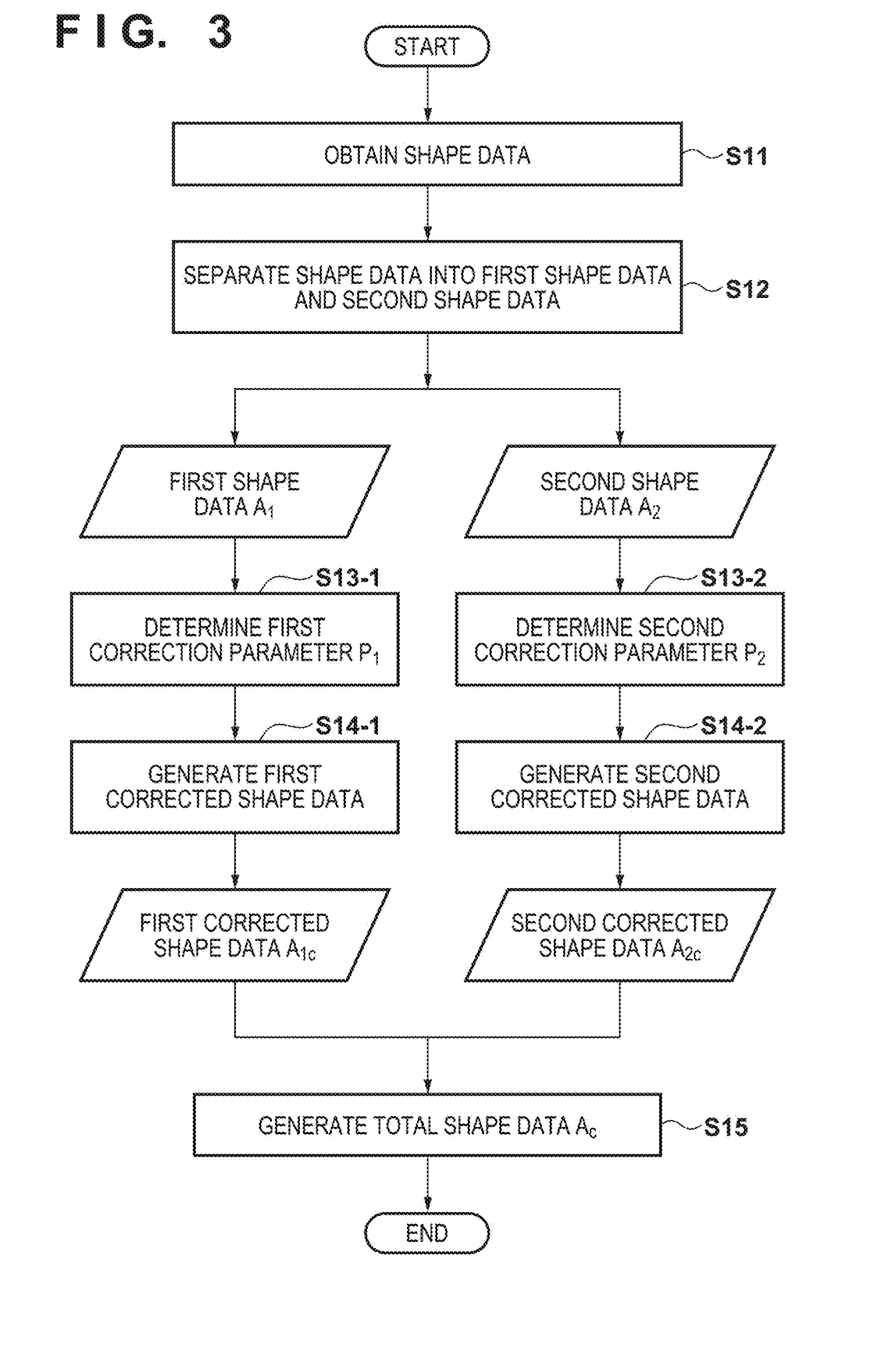
FIG. 3 is a flowchart for explaining the measurement method according to the first embodiment.

In FIG. 2B, the first shape data $d_{f1}$ including the measurement error of the surface W is indicated by a broken line, the second shape data $d_{f2}$ including the measurement error of the surface W is indicated by an alternate long and short dashed line, and a true shape R of the surface W is indicated by a solid line. The first shape data $d_{f1}$ and the second shape data $d_{f2}$ include the position error Δh of the probe mirror 105 caused by the inclination angle θ of the surface W, as shown in FIG. 4C. The position error Δh is a function of the inclination angle θ of the surface W, and is the measurement error itself included in the first shape data $d_{f1}$ and the second shape data $d_{f2}$. Hence, this is determined as the correction parameter. The inclination angle θ of the surface W, which is a parameter used to obtain the position error Δh, can be obtained from the designed shape of the surface W in advance or obtained by pre-measurement of the shape of the surface W.

Figure 5:
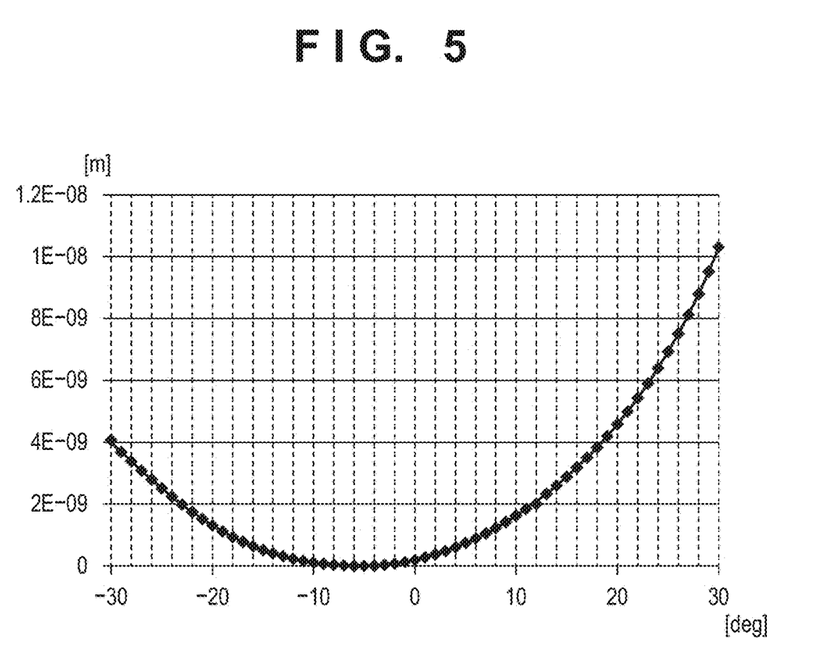
FIG. 5 is a graph showing an example of a correction parameter.

FIG. 5 is a graph showing an example of the correction parameter in the above-described design condition. In FIG. 5, the inclination angle θ [deg] of the surface W is employed on the abscissa, and the value of the correction parameter, that is, a correction amount [m] is employed on the ordinate. In the range where the inclination angle θ of the surface W is −30 [deg] to 0 [deg], the scan direction of the measurement probe 101 is the downward direction. In the range where the inclination angle θ of the surface W is 0 [deg] to +30 [deg], the scan direction of the measurement probe 101 is the upward direction. Referring to FIG. 5, a correction amount corresponding to each inclination angle θ of the surface W is plotted. The first correction parameter $P_1$ when the measurement probe 101 is scanned in the x-axis direction can be determined by associating the relationship between the correction amount and the inclination angle θ of the surface W shown in FIG. 5 with a profile representing the inclination angle θ of the surface W. The second correction parameter $P_2$ when the measurement probe 101 is scanned in the −x-axis direction can be determined in the same way. Note that the relationship between the correction amount and the inclination angle θ of the surface W as shown in FIG. 5 is stored in a storage unit, for example, a memory in the control unit 108.

The second method of determining the correction parameter will be described next. In the second method, a prototype standard having a known inclination angle (inclination amount) is measured by the measurement apparatus 1, and the position error Δh, that is, the value of the correction parameter (correction amount) corresponding to each inclination angle of the prototype standard is obtained in advance. The first correction parameter $P_1$ and the second correction parameter $P_2$ are determined by associating the relationship between the correction amount and the inclination angle of the prototype standard with a profile representing the inclination angle θ of the surface W. Note that the relationship between the correction amount and the inclination angle of the prototype standard is stored in a storage unit, for example, a memory in the control unit 108.

Figure 2C:
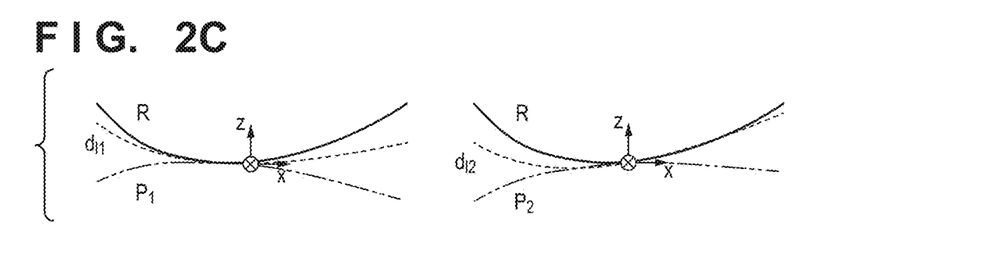

Referring back to FIG. 3, in step S14-1, the first shape data $A_1$ is corrected using the first correction parameter $P_1$, thereby generating first corrected shape data $A_{1c}$. More specifically, as shown in FIG. 2C, the first correction parameter $P_1$ indicated by an alternate long and two short dashed line is subtracted from the first shape data $d_{f1}$, thereby obtaining the first corrected shape data $A_{1c}$. The first corrected shape data $A_{1c}$ is formed from the first shape data $d_{f1}$ corrected by the first correction parameter $P_1$.

Similarly, in step S14-2, the second shape data $A_2$ is corrected using the second correction parameter $P_2$, thereby generating second corrected shape data $A_{2c}$. More specifically, as shown in FIG. 2C, the second correction parameter $P_2$ indicated by an alternate long and two short dashed line is subtracted from the second shape data $d_{f2}$, thereby obtaining the second corrected shape data $A_{2c}$. The second corrected shape data $A_{2c}$ is formed from the second shape data $d_{f2}$ corrected by the second correction parameter $P_2$.

Figure 2D:
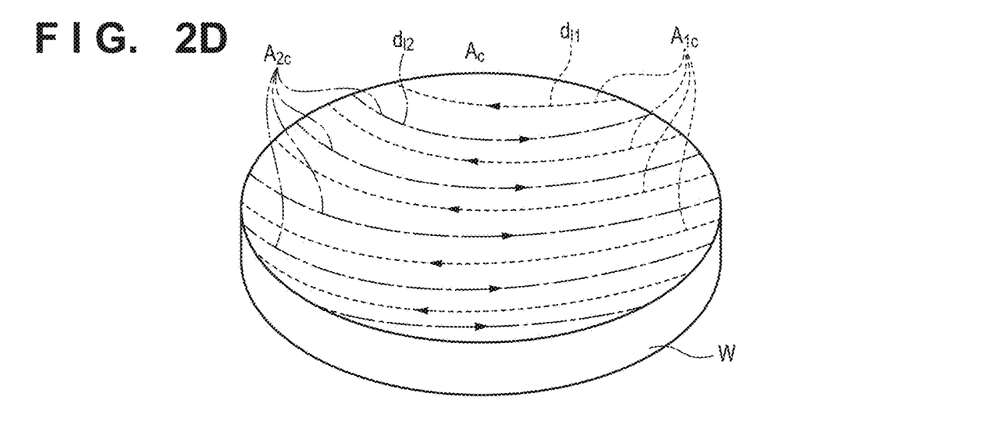

In step S15, the first corrected shape data $A_{1c}$ generated in step S14-1 and the second corrected shape data $A_{2c}$ generated in step S14-2 are composited to generate total shape data $A_c$ representing the total shape of the surface W, as shown in FIG. 2D. Since the measurement error caused by the scan direction of the measurement probe 101 is reduced in the total shape data $A_c$, the measurement error of the higher-order spatial frequency component having a step shape as shown in FIG. 1C is reduced, as can be understood. In addition, since the total shape data $A_c$ uses all of the first shape data $d_{f1}$ and the second shape data $d_{f2}$, the resolution is maintained, as can be understood. Note that the total shape of the surface W does not simply mean only the total shape of the surface W but also includes the total shape of the region to be measured.

In step S15, the first corrected shape data $A_{1c}$ and the second corrected shape data $A_{2c}$ may simply be composited as coordinate data. Translation/rotation processing may be performed by shifting or tilting each of the first corrected shape data $A_{1c}$ and the second corrected shape data $A_{2c}$ so as to reduce the step-shaped error. When generating the total shape data $A_c$ arbitrary coordinate points may be obtained by performing interpolation processing based on the first corrected shape data $A_{1c}$ and the second corrected shape data $A_{2c}$.

According to this embodiment, even if shape data measured by scanning the surface W with the measurement probe 101 includes a measurement error caused by the scan direction of the measurement probe 101, it is possible to accurately measure the shape of the surface W in a short time.

Second Embodiment

In the first embodiment, the correction parameter is determined based on the inclination angle θ of the surface W, and corrects shape data using the correction parameter, thereby reducing the higher-order measurement error caused by the scan direction of the measurement probe 101, as described above.

In this embodiment, examine a dynamic friction coefficient μ and the scan speed of a measurement probe 101. A position error Δh of a probe mirror 105 includes the dynamic friction coefficient μ, as indicated by equation (11). In the first embodiment, the dynamic friction coefficient μ is a constant. However, for example, when a lubricant is applied to a surface W to be measured, the dynamic friction coefficient μ can change. The dynamic friction coefficient μ is known to be a variable conforming to a so-called Stribeck curve determined by a scan speed v of the measurement probe 101, a contact force F, and a viscosity η of the lubricant.

The Stribeck curve is described in, for example, "Research Outlook of Positioning Technology for Ultraprecision Machine Tools (Transactions of JSME, Vol. 76, No. 769, p. 2167)". The Stribeck curve is a graph showing the behavior of the dynamic friction coefficient μ when the variable is (v·η/F). Hence, the dynamic friction coefficient μ is expressed as a function including a variable given by $$\mu = \mu(v \cdot \eta / F) \tag{12}$$

Figure 6:
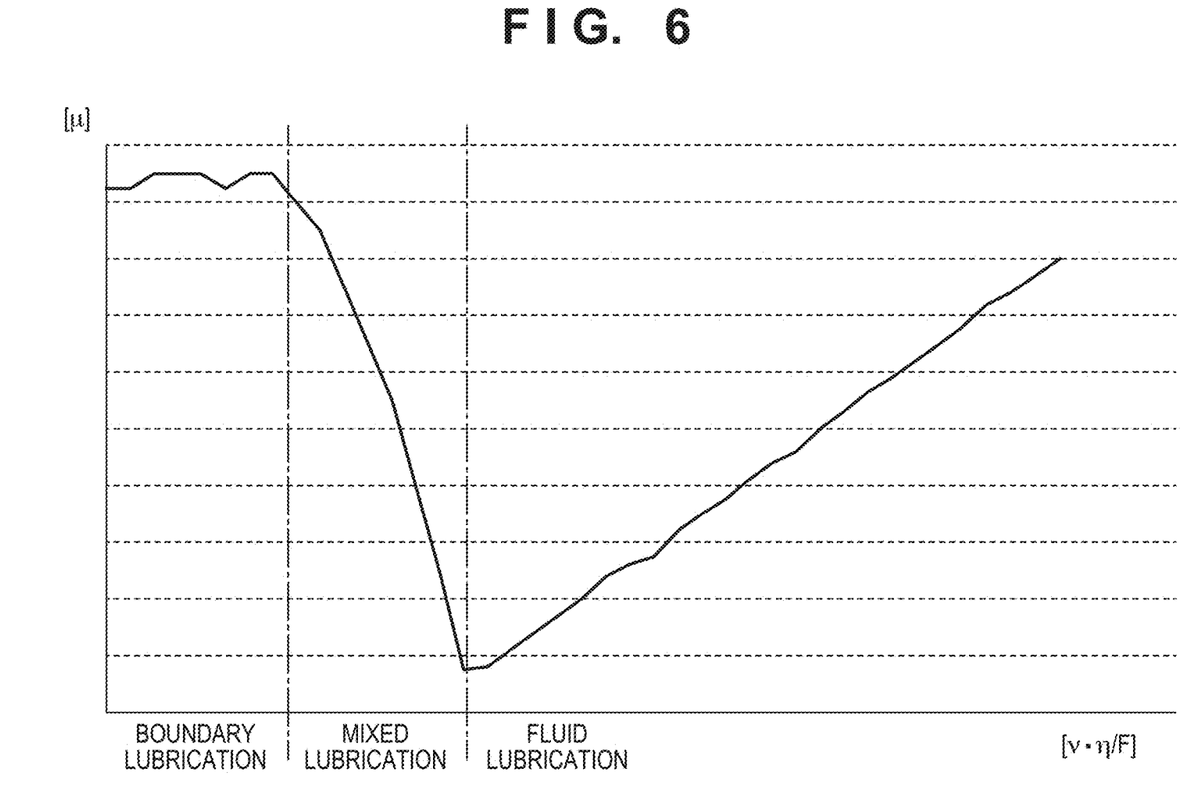
FIG. 6 is a graph showing an example of a dynamic friction coefficient on a surface.

Equation (12) represents a curve as shown FIG. 6 empirically. As can be seen from FIG. 6, the characteristic of the dynamic friction coefficient μ largely changes depending on the lubrication state of the surface W. In a "fluid lubrication" region where a lubricant film is always formed on the surface W, the dynamic friction coefficient μ is almost linear with respect to the above-described variable. On the other hand, in a "boundary lubrication" region, the dynamic friction coefficient μ is almost constant. In a "mixed lubrication" region where "fluid lubrication" and "boundary lubrication" coexist, the dynamic friction coefficient μ exhibits a curve that connects them.

Based on equations (11) and (12), the position error Δh of the probe mirror 105 serving as a correction parameter is given by $$\Delta h = h(1 - \cos\phi) = h\left\{1 - \cos\left\{\frac{Fl}{K} \cdot \frac{\sin\theta + \mu(v \cdot \eta / F)\cos\theta}{\cos\theta - \mu(v \cdot \eta / F)\sin\theta}\right\}\right\} \tag{13}$$

When first shape data $A_1$ and second shape data $A_2$ are corrected using a first correction parameter $P_1$ and a second correction parameter $P_2$, respectively, first corrected shape data $A_{1c}$ and second corrected shape data $A_{2c}$ can be obtained.

Figure 7:
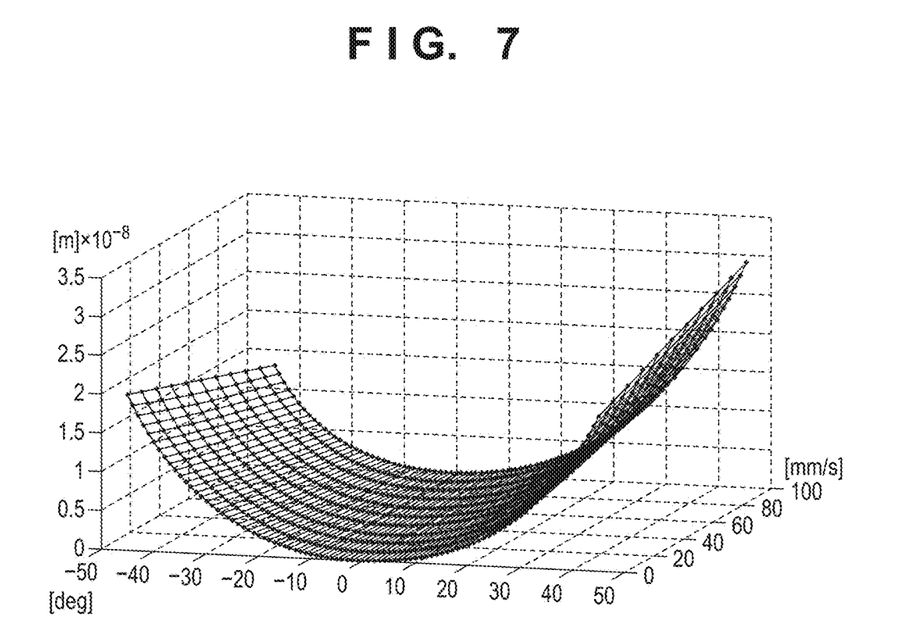
FIG. 7 is a graph showing an example of a correction parameter.

For example, consider a case where the measurement probe 101 is scanned in the "fluid lubrication" region. If the contact force F and the viscosity η of the lubricant are constant, the dynamic friction coefficient μ is given by $$\mu(v \cdot \eta / F) = k \cdot v \tag{14}$$

where k is a proportionality constant. Hence, equation (14) indicates that the dynamic friction coefficient μ is proportional to the scan speed v of the measurement probe 101. A correction parameter as shown in FIG. 7 is obtained from equations (13) and (14). Here, k=0.002. Referring to FIG. 7, when the scan speed v of the measurement probe 101 changes from 0 to 100 mm/s, the position error Δh of the probe mirror 105 changes. In particular, the higher the scan speed v of the measurement probe 101 is, the smaller the angle at which the position error Δh of the probe mirror 105 is minimized becomes from 0°. When the scan speed v is 100 mm/s, the position error Δh is minimized at about −11°.

Even if the measurement probe 101 is scanned, for example, in the x-axis direction at a predetermined speed, the scan speed v changes in accordance with an inclination angle θ of the surface W. Such a model of the scan speed v of the measurement probe 101 may be employed as a correction parameter.

Figure 8:
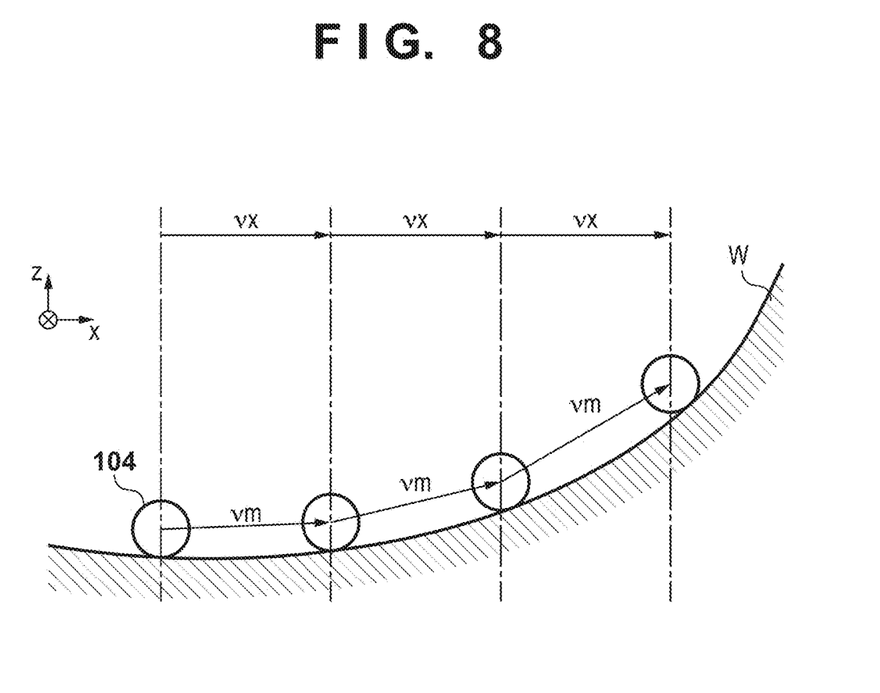
FIG. 8 is a view showing the state of a probe sphere when a measurement probe is scanned at a predetermined speed.

Assume a case where the measurement probe 101 is scanned in the x-axis direction at a predetermined speed vx, as shown in FIG. 8. In this case, a probe sphere 104 in contact with the surface W is actually driven in the z-axis direction as well and therefore has a speed component in the z-axis direction represented by vx·sin θ with respect to the angle made by the x-y plane and the scan direction of the measurement probe 101, that is, the inclination angle θ. Hence, a scan speed vm of the probe sphere 104 is given by $$vm = vx / \cos\theta \tag{15}$$

Referring to equation (15), when the measurement probe 101 is scanned in the x-axis direction at the predetermined speed vx, the actual scan speed of the probe sphere 104 (measurement probe 101) on the surface W is obtained as a function of the inclination angle θ of the surface W. Hence, when the scan speed of the measurement probe 101 in the x-axis direction is converted into the scan speed of the probe sphere 104, accuracy of the correction parameter can further be improved.

A prototype standard having a known inclination angle (inclination amount) may be measured by a measurement apparatus 1, and the position error Δh, that is, the value of the correction parameter (correction amount) corresponding to the scan speed of the measurement probe 101 (probe sphere 104) at that time may be obtained in advance.

According to this embodiment, even if the scan speed of the measurement probe 101 is arbitrarily set, the shape of the surface W can be measured accurately in a short time by correcting shape data using a correction parameter based on the scan speed.

Third Embodiment

Figure 9:
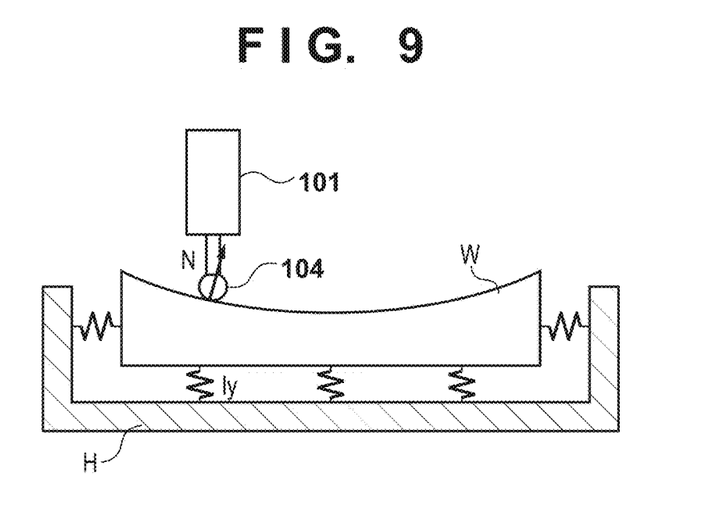
FIG. 9 is a view for explaining a measurement error caused by a frictional force at the contact point between the probe sphere and the surface.

In this embodiment, a measurement error caused by displacement (rigid displacement) of a surface W to be measured will be examined. A measurement error caused by a frictional force at the contact point between a probe sphere 104 and the surface W will be described with reference to FIG. 9. Assume a case where a measurement probe 101 is scanned in the x-axis direction while keeping the probe sphere 104 in contact with the surface W having an inclination angle θ, as shown in FIG. 9. At this time, the measurement probe 101 is controlled such that the force in the z-axis direction, that is, a contact force F attains a predetermined value, as described above. The surface W is supported by a supporting device H whose support eigen value of lowest order is ω. The eigen mode corresponding to the support eigen value ω is a rotation mode about a center CG of gravity of the surface W. A moment stiffness k about the y-axis when the supporting device H supports the surface W is given by $$k = Iy \cdot \omega^2 \tag{16}$$

where Iy is the moment of inertia about the y-axis passing through the center CG of gravity of the surface W. When the measurement probe 101 is controlled such that the contact force F attains a predetermined value, a torque T given by $$T = F \cdot r \tag{17}$$

is applied to the surface W in accordance with the force applied to the surface W and a distance r between the contact point of the probe sphere 104 and the center CG of gravity of the surface W.

An equation of motion of rotation by the torque T is represented by $$T = -k \cdot \varphi \quad (18)$$

where $\varphi$ is the inclination amount of the surface itself. When the measurement probe 101 gives the torque T to the surface W, as shown in FIG. 9, the surface W inclines with respect to measured coordinates, resulting in a measurement error $\Delta hw$. From equations (16) to (18), the measurement error $\Delta hw$ is given by $$\Delta hw = r \cdot \varphi = -\frac{F}{I_y \cdot \omega^2} r^2 \quad (19)$$

When shape data is corrected using the measurement error $\Delta hw$ as a correction parameter, corrected shape data can be obtained.

Figure 10:
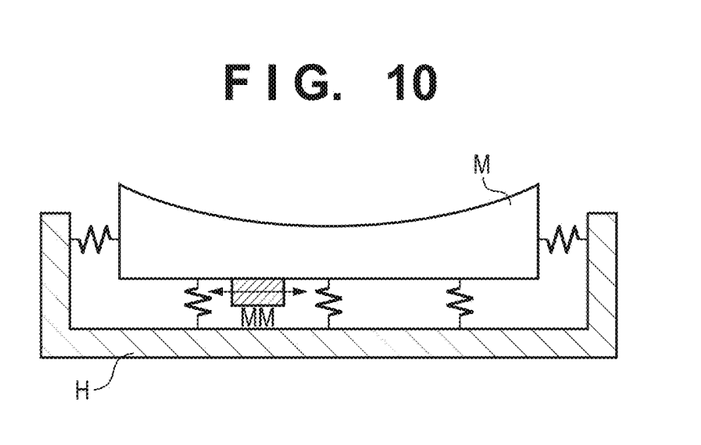
FIG. 10 is a view showing a prototype standard including a variable weight capable of changing weight balance.

A prototype standard having a known inclination angle (inclination amount) may be measured by a measurement apparatus 1, and the position error $\Delta hw$, that is, the value of the correction parameter (correction amount) corresponding to the coordinates (position) of the measurement probe 101 (probe sphere 104) at that time may be obtained in advance. In this case, however, the measurement error changes depending on the relationship between the measured coordinates of the prototype standard and the coordinates of the center of gravity of the prototype standard. Hence, the correction parameter may be obtained using a plurality of different prototype standards. Alternatively, as shown in FIG. 10, a variable weight MM capable of changing weight balance of a prototype standard M may be provided, and a correction parameter in arbitrary weight balance may be obtained.

According to this embodiment, even if a measurement error is caused by the support stiffness when the surface W is supported by the measurement apparatus 1, the shape of the surface W can be measured accurately in a short time by correcting shape data using a correction parameter based on the coordinates of the surface W.

Fourth Embodiment

Figure 11:
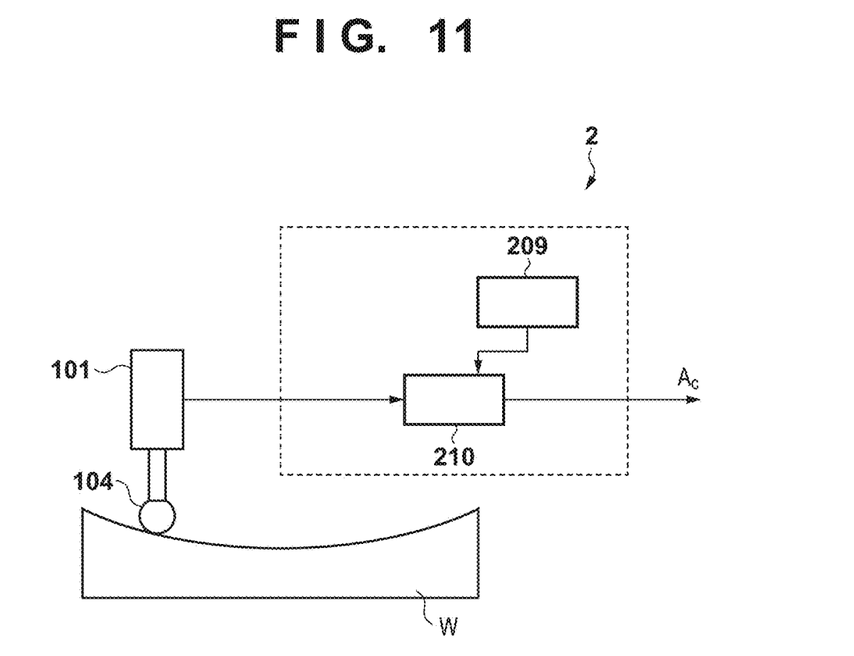
FIG. 11 is a schematic view showing the arrangement of an information processing apparatus that executes a measurement method of measuring the shape of a surface.

In this embodiment, an information processing apparatus 2 including a processing unit 210 that executes the above-described measurement method will be described with reference to FIG. 11. The processing unit 210 obtains shape data, that is, first shape data A1 and second shape data $A_2$ obtained by scanning a measurement probe 101 in a state in which a probe sphere 104 is in contact with a surface W to be measured. The processing unit 210 also executes processing of generating total shape data $A_c$ representing the total shape of the surface W using the first shape data $A_1$ and the second shape data $A_2$, that is, the above-described measurement method. More specifically, the processing unit 210 executes determination of a first correction parameter $P_1$ and a second correction parameter $P_2$ (steps S13-1 and S13-2), generation of first corrected shape data $A_{1c}$ and second corrected shape data $A_{2c}$ (steps S14-1 and S14-2), and generation of the total shape data $A_c$ (step S15).

If a correction parameter is obtained in advance by, for example, measuring a prototype standard, the correction parameter may be stored in a storage unit 209 of the information processing apparatus 2. In this case as well, the total shape data Ac can be obtained by causing the processing unit 210 to correct shape data using the correction parameter stored in the storage unit 209.

Fifth Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197507 filed Sep. 26, 2014, which is hereby incorporated by reference herein in its entirety.

What is claimed is:

1. A calculation method of calculating a shape of a surface to be measured, comprising:
    a first step of obtaining first shape measurement data representing a shape of a line region of the surface obtained by measuring the line region while scanning a probe in a first direction with respect to the surface and second shape measurement data representing a shape of a line region of the surface obtained by measuring the line region while scanning the probe in a second direction different from the first direction with respect to the surface;
    a second step of, based on an inclination angle of the surface which is an angle made by a horizontal plane and a plane, including a scan direction of the probe, in contact with the surface at a point where the probe contacts the surface, determining a first correction parameter used to correct a measurement error caused by scanning the probe in the first direction and a second correction parameter used to correct a measurement error caused by scanning the probe in the second direction; and
    a third step of obtaining first corrected shape data by correcting the first shape measurement data using the first correction parameter, obtaining second corrected shape data by correcting the second shape measurement data using the second correction parameter, and generating total shape data representing a total shape of the surface by compositing the first corrected shape data and the second corrected shape data, wherein the first direction and the second direction are opposite to each other, and the probe includes a probe shaft, a leaf spring that holds the probe shaft, a probe sphere provided at one end of the probe shaft, and a probe mirror provided at the other end of the probe shaft, letting φ be an inclination of the probe shaft when the probe is scanned with respect to the surface, l be a length of the probe shaft from the probe sphere to the leaf spring, h be a length of the probe shaft from the leaf spring to the probe mirror, K be a torsional stiffness of the leaf spring, μ be a dynamic friction coefficient when the probe is scanned in a state in which the probe sphere is in contact with the surface, and F be a contact force at a contact point between the surface and the probe sphere, in the second step, Δh as the first correction parameter and the second correction parameter is determined, in accordance with the inclination angle θ of the surface, by $$\Delta h = h(1-\cos\phi) = h\left\{1-\cos\left(\frac{Fl}{K}\cdot\frac{\sin\theta+\mu\cos\theta}{\cos\theta-\mu\sin\theta}\right)\right\}.$$

2. The method according to claim 1, wherein the first direction is an upward direction with respect to the surface, and the second direction is a downward direction with respect to the surface.

3. The method according to claim 2, wherein the inclination angle of the surface changes a sign between the upward direction and the downward direction with respect to the surface.

4. The method according to claim 1, wherein in the second step, the first correction parameter and the second correction parameter are determined based on a scan speed of the probe as well.

5. The method according to claim 1, wherein in the second step, the first correction parameter and the second correction parameter are determined based on a distance from a center of gravity of the surface to a contact point between the probe and the surface as well.

6. A measurement apparatus for measuring a shape of a surface to be measured, comprising:
a probe configured to measure the surface; and
a control unit configured to perform processing of obtaining the shape of the surface,
wherein the control unit
obtains first shape measurement data representing a shape of a line region of the surface obtained by measuring the line region while scanning the probe in a first direction with respect to the surface and second shape measurement data representing a shape of a line region of the surface obtained by measuring the line region while scanning the probe in a second direction different from the first direction with respect to the surface;
determines a first correction parameter used to correct a measurement error caused by scanning the probe in the first direction and a second correction parameter used to correct a measurement error caused by scanning the probe in the second direction based on an inclination angle of the surface which is an angle made by a horizontal plane and a plane, including a scan direction of the probe, in contact with the surface at a point where the probe contacts the surface; and obtains first corrected shape data by correcting the first shape measurement data using the first correction parameter, obtains second corrected shape data by correcting the second shape measurement data using the second correction parameter, and generates total shape data representing a total shape of the surface by compositing the first corrected shape data and the second corrected shape data, wherein the first direction and the second direction are opposite to each other, and the probe includes a probe shaft, a leaf spring that holds the probe shaft, a probe sphere provided at one end of the probe shaft, and a probe mirror provided at the other end of the probe shaft, letting φ be an inclination of the probe shaft when the probe is scanned with respect to the surface, l be a length of the probe shaft from the probe sphere to the leaf spring, h be a length of the probe shaft from the leaf spring to the probe mirror, K be a torsional stiffness of the leaf spring, μ be a dynamic friction coefficient when the probe is scanned in a state in which the probe sphere is in contact with the surface, and F be a contact force at a contact point between the surface and the probe sphere, the control unit determines Δh as the first correction parameter and the second correction parameter in accordance with the inclination angle θ of the surface, by $$\Delta h = h(1-\cos\phi) = h\left\{1-\cos\left(\frac{Fl}{K}\cdot\frac{\sin\theta+\mu\cos\theta}{\cos\theta-\mu\sin\theta}\right)\right\}.$$

7. A non-transitory computer-readable storage medium storing a program that causes a computer to execute processing of obtaining a shape of a surface to be measured, the program causing the computer to execute:
a first step of obtaining first shape measurement data representing a shape of a line region of the surface obtained by measuring the line region while scanning a probe in a first direction with respect to the surface and second shape measurement data representing a shape of a line region of the surface obtained by measuring the line region while scanning the probe in a second direction different from the first direction with respect to the surface;
a second step of, based on an inclination angle of the surface which is an angle made by a horizontal plane and a plane, including a scan direction of the probe, in contact with the surface at a point where the probe contacts the surface, determining one of a first correction parameter used to correct a measurement error caused by scanning the probe in the first direction and a second correction parameter used to correct a measurement error caused by scanning the probe in the second direction; and
a third step of obtaining first corrected shape data by correcting the first shape measurement data using the first correction parameter, obtaining second corrected shape data by correcting the second shape measurement data using the second correction parameter, and generating total shape data representing a total shape of the surface by compositing the first corrected shape data and the second corrected shape data, wherein the first direction and the second direction are opposite to each other, and the probe includes a probe shaft, a leaf spring that holds the probe shaft, a probe sphere provided at one end of the probe shaft, and a probe mirror provided at the other end of the probe shaft, letting $\phi$ be an inclination of the probe shaft when the probe is scanned with respect to the surface, l be a length of the probe shaft from the probe sphere to the leaf spring, h be a length of the probe shaft from the leaf spring to the probe mirror, K be a torsional stiffness of the leaf spring, $\mu$ be a dynamic friction coefficient when the probe is scanned in a state in which the probe sphere is in contact with the surface, and F be a contact force at a contact point between the surface and the probe sphere, in the second step, $\Delta h$ as the first correction parameter and the second correction parameter is determined, in accordance with the inclination angle $\theta$ of the surface, by $$\Delta h = h(1 - \cos\phi) = h\left\{1 - \cos\left(\frac{Fl}{K} \cdot \frac{\sin\theta + \mu\cos\theta}{\cos\theta - \mu\sin\theta}\right)\right\}.$$

8. An information processing apparatus, the apparatus comprising a processing unit configured to perform processing of obtaining a shape of a surface to be measured, wherein the processing unit obtains first shape measurement data representing a shape of a line region of the surface obtained by measuring the line region while scanning a probe in a first direction with respect to the surface and second shape measurement data representing a shape of a line region of the surface obtained by measuring the line region while scanning the probe in a second direction different from the first direction with respect to the surface;

determines one of a first correction parameter used to correct a measurement error caused by scanning the probe in the first direction and a second correction parameter used to correct a measurement error caused by scanning the probe in the second direction based on an inclination angle of the surface which is an angle made by a horizontal plane and a plane, including a scan direction of the probe, in contact with the surface at a point where the probe contacts the surface; and obtains first corrected shape data by correcting the first shape measurement data using the first correction parameter, obtains second corrected shape data by correcting the second shape measurement data using the second correction parameter, and generates total shape data representing a total shape of the surface by compositing the first corrected shape data and the second corrected shape data, wherein the first direction and the second direction are opposite to each other, and the probe includes a probe shaft, a leaf spring that holds the probe shaft, a probe sphere provided at one end of the probe shaft, and a probe mirror provided at the other end of the probe shaft, letting $\phi$ be an inclination of the probe shaft when the probe is scanned with respect to the surface, l be a length of the probe shaft from the probe sphere to the leaf spring, h be a length of the probe shaft from the leaf spring to the probe mirror, K be a torsional stiffness of the leaf spring, $\mu$ be a dynamic friction coefficient when the probe is scanned in a state in which the probe sphere is in contact with the surface, and F be a contact force at a contact point between the surface and the probe sphere, the processing unit determines $\Delta h$ as the first correction parameter and the second correction parameter in accordance with the inclination angle $\theta$ of the surface, by $$\Delta h = h(1 - \cos\phi) = h\left\{1 - \cos\left(\frac{Fl}{K} \cdot \frac{\sin\theta + \mu\cos\theta}{\cos\theta - \mu\sin\theta}\right)\right\}.$$

* * * * *